No. 816,838. PATENTED APR. 3, 1906.
L. F. ADT.
LENS MOUNT AND CONNECTION FOR EYEGLASSES.
APPLICATION FILED MAY 9, 1905.
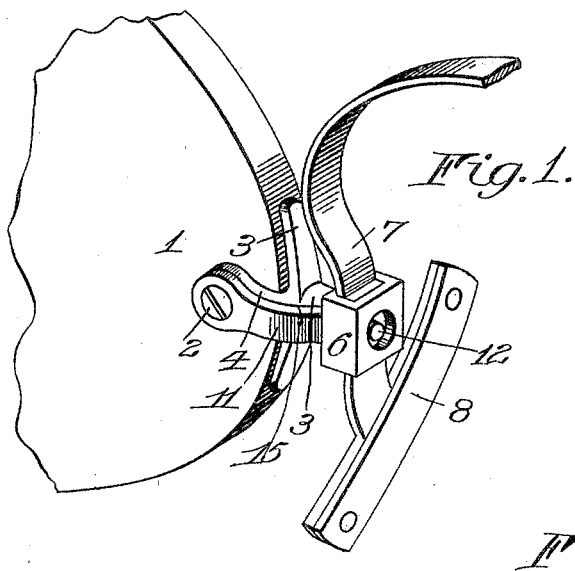
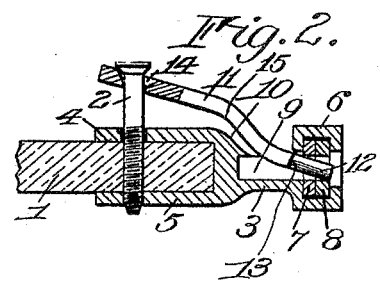
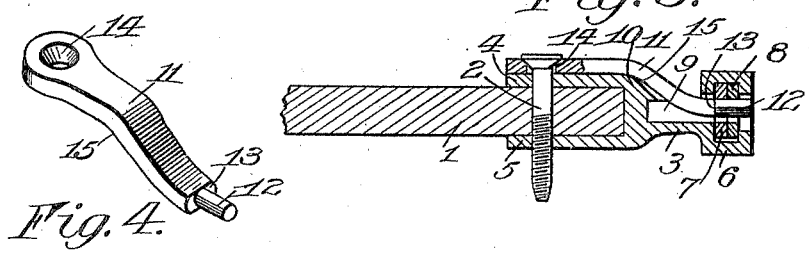
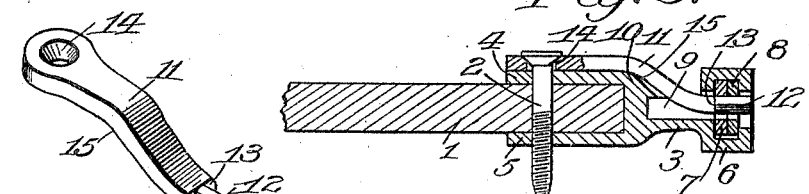
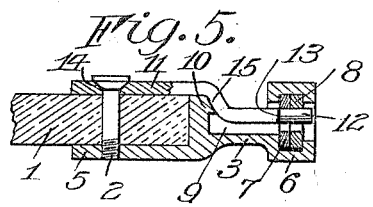
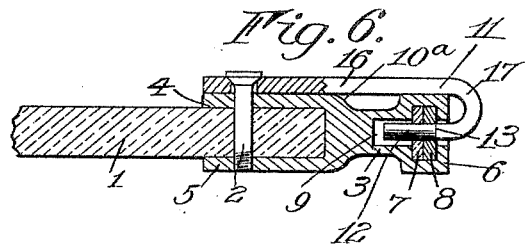
Witnesses
Walter B. Payne
Clarence A. Bateman
Inventor
Leo F. Adt
By Frederick S. Church
Attorney

UNITED STATES PATENT OFFICE.

LEO F. ADT, OF TROY, NEW YORK.

LENS-MOUNT AND CONNECTION FOR EYEGLASSES.

No. 816,838.        Specification of Letters Patent.        Patented April 3, 1906.

Application filed May 9, 1905. Serial No. 259,555.

*To all whom it may concern:*

Be it known that I, LEO F. ADT, of Troy, in the county of Rensselaer, State of New York, have invented certain new and useful Improvements in Lens-Mounts and Connections for Eyeglasses; and I do hereby declare the following to be a full, clear, and exact description of the same, reference being had to the accompanying drawings, forming a part of this specification, and to the reference-numerals marked thereon.

My present invention relates to devices for securing the lenses and bridge and guard together and to the body of the mounting; and the purpose of my invention is to provide devices of this kind which enable the various parts of the mounting to be secured together and to the lenses with the greatest security and without requiring the use of the usual fastening-screws such as are generally employed for securing the spring and guards to the lens-attaching devices and which are liable to loosen.

To these and other ends my invention consists of certain improvements and combinations of parts, all as will be hereinafter more fully described, the novel features being pointed out in the claims at the end of the specification.
In the drawings, Figure 1 is a perspective view of a portion of a mounting for eyeglasses embodying my invention. Fig. 2 is a horizontal sectional view through the lens-mount and connection, showing how the spring and guard and the lens are secured. Fig. 3 is a view similar to Fig. 2, showing the lens and parts of the mounting secured and locked. Fig. 4 is a perspective view of the spring and guard locking device removed from the mounting. Fig. 5 is a view similar to Fig. 3, showing the invention applied to a lens-mount having a single attaching-arm; and Fig. 6 is a sectional view through the lens and the attaching device, showing the locking device entering an ordinary connection from its inner side.

Similar parts are designated by the same reference-numerals in the several views.

One form of my invention is illustrated in Figs. 1, 2, and 3 of the accompanying drawings, wherein 1 designates one of the lenses perforated near one edge in the usual way to receive the securing-screw 2 for attaching the device for connecting the lens and the different parts of the mounting. This device in the form shown in these figures comprises a post 3, provided with a pair of attaching-arms 4 and 5, arranged to receive the lens between them and apertured for the securing-screw 2, and to this post is also attached a box or seat 6 for the reception of the spring and guard arms. This box or seat may be of any desired form; but I prefer to employ a box which is closed at its inner side, into which the spring and guard arms 7 and 8, respectively, are adapted to fit, an aperture 9 being extended through the box to aline with the usual apertures of the spring and guard arms.

A portion of the post is formed into a shoulder having an incline 10, leading toward the aperture 9 of the box, and entering the latter from the rear in the present instance is a locking member 11, having a reduced portion 12 therein adapted to enter the apertures of the spring and guard arms, and a shoulder 13 on this member is arranged to engage the spring and guard arms to clamp them against the inner side of the box. Any suitable means may be employed for operating this locking member in such a way that it will securely fasten the separable parts of the mounting within the box; but I prefer to so construct this member that the lens-securing screw 2 may serve for this purpose, a countersunk aperture 14 being provided on the said member to coöperate with the tapered head of the screw, whereby the operation of tightening the lens-securing screw will operate the locking member longitudinally, and thereby cause the shoulder 13 thereon to firmly clamp the separable parts of the mounting against the inner side of the box, and the same operation serves to secure the attaching device to the lens, and the resistance offered to the operation of the locking member will produce a binding action between it and the screw that will prevent loosening of the latter.

In order to supplement the drifting action of the locking member due to the coöperation of the tapered screw-head and the countersunk portion of the locking member, the latter may be formed with an incline 15, so arranged that as the lens-securing screw is tightened the incline 15, coöperating with the incline 10 of the post, will cause the locking member to be shifted, so that all looseness between the box and the separable parts of the mounting may be taken up, the final tightening of the screw serving to lock the parts.

In addition to the clamping action produced between the shoulders of the locking member and the inner side of the box a relatively lateral binding action may be obtained between the reduced portion 12 of the locking member and the separable parts of the mounting which will cause the latter to be held firmly against one side of the box, and this action is obtained in the present form of my invention by forming the locking member comparatively rigid and shaping it so that it will bear upon the shoulder of the post as a fulcrum, and therefore tightening of the lens-securing screw will produce a tilting motion of the locking member, and this will tend to swing that portion of the locking member which coöperates with the separable parts of the mounting toward one side of the box, and this binding action, together with the clamping action obtained in the manner herein described, will effectually lock the spring and guard or other parts of the mounting.

The invention may also be applied to lens-attaching devices having a single attaching-arm, such as that shown in Fig. 5, the locking member operating substantially in the manner of that shown in Figs. 1, 2, and 3, and in this form of the invention the tilting action of the locking member bearing on the post as a fulcrum and the coöperative relation of the inclined portions of the operating member and the post will tend to reinforce the attaching device in such a way as to prevent bending action between it and the lens, and this form of the invention enables lenses of different thicknesses to be accommodated.

This invention also enables the spring and guards to be fastened from their inner sides, a connection of this kind being shown in Fig. 6, wherein the locking member 16 is provided with a doubled portion 17, the end of which is formed to coöperate with the spring and guard arms at their inner sides to clamp them outwardly and toward the lens edge, a countersunk aperture being formed in this member to coöperate with the tapered head of the lens-securing screw to drift the locking member outwardly toward the lens, and in this form of the invention the tilting action of the locking member for producing a binding effect upon the separable parts of the mounting may be obtained by fulcruming the locking member 16 upon the shoulder 10ª of the post, and in this form of my invention any form of box for the spring and guards may be used.

A device embodying my invention is capable of firmly locking the spring and guards and other separable parts of the mounting together without requiring the use of the usual fastening-screw, which is subject to loosening and other objections, and as the locking device for the spring and guard is locked in position, preferably by the lens-securing screw, the latter not only serves to secure the lens to the attaching device, but locks the spring and guard, and the strain between the locking member and lens-securing screw will produce a binding action on the latter tending to prevent loosening thereof.

I claim as my invention—

1. In eyeglasses, the combination with a lens, an attaching device having means for securing it to the lens, and the mounting adapted to be fastened to the attaching device, of a locking member for the mounting secured in position by the lens-securing means.

2. In eyeglasses, the combination with an apertured lens, an attaching device a securing-screw passing through the lens-aperture, and the mounting adapted to be secured to the attaching device, of a locking device operated by the lens-screw for fastening the mounting to the attaching device.

3. In eyeglasses, the combination with a lens, an attaching device, a lens-securing screw, and a mounting adapted to be secured to the attaching device, of a device locked by the lens-screw for fastening the mounting and attaching device.

4. In eyeglasses, the combination with a lens having an attaching device thereon adapted to receive an apertured attaching portion of the mounting, of a device for connecting the mounting and attaching device embodying a member having a projection entering the aperture of the attaching portion and a shoulder coöperating with the sides of the said portion, and means for operating the said member.

5. In eyeglasses, the combination with a lens, and an attaching device provided with a receptacle for the apertured attaching portions of the mounting, of a locking device having a portion arranged to enter the aperture of the attaching portion and bearing on a portion of the attaching device as a fulcrum, and means operating on the locking device to tilt it about its fulcrum and thereby bind the attaching portion of the mounting against the attaching device.

6. In eyeglasses, the combination with a lens, and an attaching device secured thereto adapted to receive the attaching portions of the mounting, said device having an inclined portion formed thereon, of a member for connecting the attaching portions of the mounting and the attaching device having an inclined portion arranged to coöperate with the corresponding portion of the attaching device for operating the said member to secure the mounting.

7. In eyeglasses, the combination with a lens, a lens-securing screw and an attaching device, adapted to receive the attaching portions of the mounting, of a member operated by the lens-screw and arranged to coöperate with the attaching portions of the mounting to clamp them to the attaching device.

8. In eyeglasses, the combination with a lens, a lens-securing screw and an attaching device, adapted to receive the attaching portion of the mounting, of a locking member having a countersunk aperture therein to coöperate with the lens-screw for operating the member, a portion of the latter coöperating with the attaching portion of the mounting to secure it to the attaching device.

9. In eyeglasses, the combination with a lens, and an attaching device adapted to be secured thereto having a box or receptacle to receive the attaching portions of the mounting, of a locking member having a portion arranged to coöperate with the attaching portions of the mounting and bearing on a portion of the attaching device as a fulcrum, and means operating on the locking member to produce a clamping action between the attaching portions of the mounting and the box.

10. In eyeglasses, the combination with a lens, an attaching device adapted to be secured thereto provided with an apertured box or receptacle to receive the attaching portions of the mounting, of a locking member having a portion arranged to enter the aperture of the box and coöperate with the attaching portions of the mounting, and means for operating the locking member to clamp the attaching portions of the mounting within the box.

11. In eyeglasses, the combination with a lens, an attaching device having an arm arranged to rest at one side of the lens and provided with a box or receptacle for the attaching portions of the mounting, of a locking member having a portion adapted to coöperate with the attaching portions of the mounting and bearing on the attaching device as a fulcrum, and a screw coöperating with the locking member to clamp the attaching portions of the mounting in the box and for securing the arm of the attaching device.

LEO F. ADT.

Witnesses:
 H. D. BAILEY,
 JAMES F. BYRON.